(12) United States Patent
Cheng et al.

(10) Patent No.: US 10,182,413 B2
(45) Date of Patent: Jan. 15, 2019

(54) WIRELESS POSITIONING USING SCHEDULED TRANSMISSIONS

(71) Applicant: QUALCOMM Incorporated, San Diego, CA (US)

(72) Inventors: Hong Cheng, Basking Ridge, NJ (US); Xinzhou Wu, Hillsborough, NJ (US); Lionel Jacques Garin, Palo Alto, CA (US)

(73) Assignee: QUALCOMM Incorporated, San Diego, CA (US)

(*) Notice: Subject to any disclaimer, the term of this patent is extended or adjusted under 35 U.S.C. 154(b) by 677 days.

(21) Appl. No.: 14/446,738

(22) Filed: Jul. 30, 2014

(65) Prior Publication Data
US 2016/0037477 A1 Feb. 4, 2016

(51) Int. Cl.
| | |
|---|---|
| H04J 3/06 | (2006.01) |
| H04W 24/10 | (2009.01) |
| H04W 64/00 | (2009.01) |
| G01S 5/00 | (2006.01) |
| G01S 5/02 | (2010.01) |

(Continued)

(52) U.S. Cl.
CPC ........... *H04W 64/00* (2013.01); *G01S 5/0045* (2013.01); *G01S 5/0221* (2013.01); *G01S 5/10* (2013.01); *H04J 3/0635* (2013.01); *H04W 24/10* (2013.01); *G01S 5/06* (2013.01)

(58) Field of Classification Search
CPC ..... H04W 64/00; H04W 24/10; G01S 5/0045; G01S 5/0221; G01S 5/10; H04J 3/0635
See application file for complete search history.

(56) References Cited

U.S. PATENT DOCUMENTS

| | | |
|---|---|---|
| 7,304,610 B2 | 12/2007 | Ninomiya et al. |
| 7,881,684 B2 | 2/2011 | Nakagawa et al. |

(Continued)

FOREIGN PATENT DOCUMENTS

| | | |
|---|---|---|
| CN | 103037504 A | 4/2013 |
| CN | 103857035 A | 6/2014 |

(Continued)

OTHER PUBLICATIONS

International Search Report and Written Opinion—PCT/US2015/037543—ISA/EPO—dated Sep. 14, 2015.

(Continued)

*Primary Examiner* — Qun Shen
(74) *Attorney, Agent, or Firm* — Paradice and Li LLP

(57) ABSTRACT

A station (STA) receives a schedule from a reference device in a wireless network. The schedule provides a measurement time for each of one or more wireless channels. The STA tunes to a first channel of the one or more wireless channels in accordance with the schedule. While tuned to the first channel in accordance with the schedule, the STA receives a first message from a first access point (AP). The first message, which includes a time-of-departure timestamp from the reference device, is time-stamped with a time-of-arrival timestamp. The STA receives an indication of a time at which the reference device received the first message from the first AP. The STA determines its position based in part on the time-of-departure timestamp, the time-of-arrival timestamp, and the time at which the reference device received the first message.

14 Claims, 7 Drawing Sheets

(51) Int. Cl.
*G01S 5/10* (2006.01)
*G01S 5/06* (2006.01)

(56) References Cited

U.S. PATENT DOCUMENTS

| | | | |
|---|---|---|---|
| 8,073,465 B2 | 12/2011 | Nakagawa et al. | |
| 8,165,150 B2 | 4/2012 | Aweya et al. | |
| 9,247,517 B2 | 1/2016 | Wigren et al. | |
| 9,907,047 B1 | 2/2018 | Vamaraju et al. | |
| 2004/0047324 A1* | 3/2004 | Diener | H04L 1/1664 370/338 |
| 2004/0224707 A1 | 11/2004 | Jou | |
| 2005/0020275 A1 | 1/2005 | Agrawala et al. | |
| 2008/0112380 A1* | 5/2008 | Fischer | H04W 74/0816 370/338 |
| 2008/0291883 A1 | 11/2008 | Seok | |
| 2012/0106370 A1 | 5/2012 | Radulescu et al. | |
| 2012/0136923 A1 | 5/2012 | Grube | |
| 2012/0224590 A1 | 9/2012 | Norair | |
| 2012/0229334 A1 | 9/2012 | Waters et al. | |
| 2012/0262339 A1* | 10/2012 | Garcia | G01S 5/10 342/387 |
| 2013/0157692 A1 | 6/2013 | Hall et al. | |
| 2013/0273935 A1* | 10/2013 | Amizur | H04W 24/00 455/456.1 |
| 2014/0073352 A1 | 3/2014 | Aldana et al. | |
| 2014/0132444 A1 | 5/2014 | Bird | |
| 2014/0154996 A1* | 6/2014 | Banin | H04W 56/00 455/67.11 |
| 2014/0160941 A1* | 6/2014 | Hui | H04W 24/10 370/241 |
| 2014/0187259 A1* | 7/2014 | Kakani | H04W 64/00 455/456.1 |
| 2014/0198725 A1 | 7/2014 | Abraham et al. | |
| 2014/0200026 A1 | 7/2014 | Aldana | |
| 2014/0213193 A1 | 7/2014 | Zhang et al. | |
| 2014/0254511 A1 | 9/2014 | Aldana et al. | |
| 2014/0293851 A1 | 10/2014 | Abraham et al. | |
| 2014/0295877 A1* | 10/2014 | Hart | H04W 4/02 455/456.1 |
| 2014/0327579 A1 | 11/2014 | Hart et al. | |
| 2015/0063228 A1 | 3/2015 | Aldana et al. | |
| 2015/0094103 A1 | 4/2015 | Wang et al. | |
| 2015/0139213 A1 | 5/2015 | Abraham et al. | |
| 2015/0181553 A1* | 6/2015 | Segev | H04W 64/00 455/456.1 |
| 2015/0382152 A1* | 12/2015 | Lindskog | H04W 64/00 455/456.2 |
| 2016/0309472 A1 | 10/2016 | Yong et al. | |
| 2016/0366606 A1 | 12/2016 | Steiner | |
| 2018/0014270 A1 | 1/2018 | Kakani et al. | |

FOREIGN PATENT DOCUMENTS

| | | |
|---|---|---|
| EP | 2511730 A1 | 10/2012 |
| JP | 2009229393 A | 10/2009 |
| WO | WO-9929130 A1 | 6/1999 |
| WO | WO-0215614 A1 | 2/2002 |
| WO | WO-2008147046 A1 | 12/2008 |
| WO | WO-2015031029 A1 | 3/2015 |
| WO | WO-2016081271 A1 | 5/2016 |

OTHER PUBLICATIONS

GB Search Report issued in related GB Appln. No. 1322872.1, dated Aug. 18, 2014.

IEEE: "IEEE P802.11-REVmc/D7.0", Part 11: Wireless LAN Medium Access Control (MAC) and Physical Layer (PHY) Specifications, Aug. 12, 2016, XP055407935, Retrieved from the Internet: URL:http://ieeexplore.ieee.org/stamp/stamp.jsp?tp=&arnumber=7542452 [retrieved on Sep. 19, 2017], 118 pages.

Lindskog E (CSR Technology): "Client Positioning using Timing Measurements between Access Points; 11-13-0072-00-000m-client-positioning-using-timing-measurements-between-access-points", IEEE SA Mentor; 11-13-0072-00-000M-Client-Positioning-Using-Timing-Measurements-Between-Access-Points, IEEE-SA Mentor, Piscataway, NJ USA, vol. 802.11m, Jan. 12, 2013 (Jan. 12, 2013), pp. 1-13, XP068040470, [retrieved on Jan. 12, 2013] p. 4-p. 6 p. 11.

* cited by examiner

WIRELESS POSITIONING USING SCHEDULED TRANSMISSIONS

TECHNICAL FIELD

The present embodiments relate generally to wireless communications, and specifically to determining the position of wireless devices.

BACKGROUND OF RELATED ART

A station (STA) in a wireless network (e.g., a WiFi network) may determine its position (i.e., its location) using a double-differencing technique. In double differencing, an Access Point (AP) sends a positioning message that is tagged with a time of departure (ToD) from the AP, as determined by a clock in the AP. The STA and a reference station (RS) receive the message and tag it with respective times of arrival (ToAs) using respective local clocks in the STA and RS.

When multiple positioning messages are received from different APs, the measured ToAs at the STA and RS can be used together with the ToDs to calculate a relative location of the STA. With this technique, the clock errors of the APs can be eliminated: the APs do not need to be synchronized for the double differencing to produce an accurate location of the STA. Furthermore, if the locations of the RS and the APs are known, then the absolute location of the STA may be determined.

Double differencing presents various challenges. For example, clock error between the STA and RS (e.g., resulting from clock drift in both the STA and RS) may affect the accuracy, particularly if the delay between various positioning messages is significant. In addition, different APs may use different channels. Delay in exchange of ToA timestamps between the RS and STA may reduce accuracy or result in a useless location measurement if the STA is moving. Also, a large number of STAs in the wireless network may attempt to determine their locations simultaneously.

SUMMARY

In some embodiments, a positioning method is performed in a station (STA) in a wireless network. In the positioning method, a schedule is received from a reference device in the wireless network. The schedule provides a measurement time for each of one or more wireless channels. The STA tunes to a first channel of the one or more wireless channels in accordance with the schedule. While tuned to the first channel in accordance with the schedule, a first message is received from a first access point (AP). The first message includes a time-of-departure timestamp and is time-stamped with a time-of-arrival timestamp. An indication is received of a time at which the reference device received the first message from the first AP. A position of the STA is determined based in part on the time-of-departure timestamp, the time-of-arrival timestamp, and the time at which the reference device received the first message.

In some embodiments, a non-transitory computer-readable storage medium stores one or more programs configured for execution by one or more processors in a STA in a wireless network. The one or more programs include instructions to tune, in accordance with a schedule received from a reference device in the wireless network, to a first channel of one or more wireless channels specified in the schedule. The schedule provides a measurement time for each of the one or more wireless channels. The one or more programs also include instructions to receive a first message from a first AP while tuned to the first channel in accordance with the schedule. The first message includes a time-of-departure timestamp. The one or more programs further include instructions to time-stamp the first message with a time-of-arrival timestamp and instructions to determine a position of the STA based in part on the time-of-departure timestamp, the time-of-arrival timestamp, and a time at which the reference device received the first message, as provided to the STA.

In some embodiments, a STA includes one or more antennas, a wireless modem to transmit and receive transmissions through the one or more antennas, one or more processors, and memory storing one or more programs configured for execution by the one or more processors. The one or more programs include instructions to tune, in accordance with a schedule received from a reference device in a wireless network, to a first channel of one or more wireless channels specified in the schedule. The schedule provides a measurement time for each of the one or more wireless channels. The one or more programs also include instructions to receive a first message from a first AP while tuned to the first channel in accordance with the schedule. The first message includes a time-of-departure timestamp. The one or more programs further include instructions to time-stamp the first message with a time-of-arrival timestamp and instructions to determine a position of the STA based in part on the time-of-departure timestamp, the time-of-arrival timestamp, and a time at which the reference device received the first message, as provided to the STA.

In some embodiments, a method to facilitate positioning is performed in a wireless device in a wireless network. In the method, a schedule is compiled that specifies a measurement time for each of one or more wireless channels. The schedule is provided to a STA distinct from the wireless device in the wireless network. The wireless device tunes to a respective channel of the one or more wireless channels in accordance with the schedule. While tuned to the respective channel in accordance with the schedule, a first message is received from a first AP. The first message includes a time-of-departure timestamp and is time-stamped with a time-of-arrival timestamp. The time-of-arrival timestamp is provided to the STA.

In some embodiments, a non-transitory computer-readable storage medium stores one or more programs configured for execution by one or more processors in a wireless device in a wireless network. The one or more programs include instructions to compile a schedule specifying a measurement time for each of one or more wireless channels and instructions to provide the schedule to a STA in the wireless network that is distinct from the wireless device. The one or more programs also include instructions to tune to a respective channel of the one or more wireless channels in accordance with the schedule and instructions to time-stamp a first message with a time-of-arrival timestamp. The first message is received from a first AP while the wireless device is tuned to the respective channel in accordance with the schedule. The first message includes a time-of-departure timestamp. The one or more programs further include instructions to provide the time-of-arrival timestamp to the STA.

In some embodiments, a wireless device includes one or more antennas, a wireless modem to transmit and receive transmissions through the one or more antennas, one or more processors, and memory storing one or more programs configured for execution by the one or more processors. The one or more programs include instructions to compile a schedule specifying a measurement time for each of one or more wireless channels and instructions to provide the schedule to a STA in a wireless network. The STA is distinct from the wireless device. The one or more programs also include instructions to tune to a respective channel of the one or more wireless channels in accordance with the schedule and instructions to time-stamp a first message with a time-of-arrival timestamp. The first message is received from a first AP while the wireless device is tuned to the respective channel in accordance with the schedule. The first message includes a time-of-departure timestamp. The one or more programs further include instructions to provide the time-of-arrival timestamp to the STA.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1A:
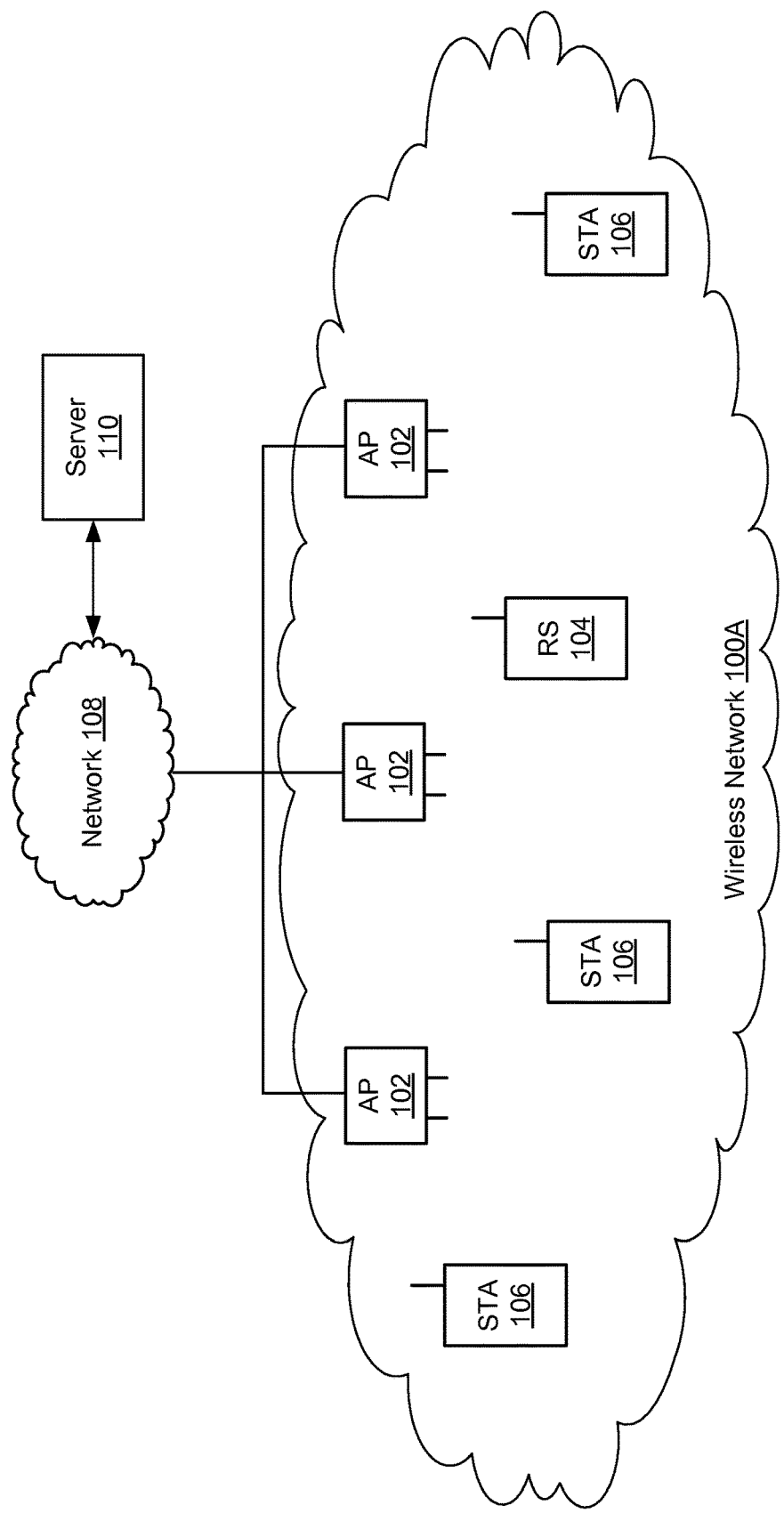
FIGS. 1A and 1B are block diagrams of wireless networks in accordance with some embodiments.

FIG. 1A is a block diagram of a wireless network 100A in accordance with some embodiments. The wireless network 100A includes access points (APs) 102, a reference station (RS) 104, and stations (STAs) 106. A respective RS 104 and/or STA 106 may be a mobile computing device (e.g., a cell phone, tablet computer, laptop computer, etc.). Alternatively, a respective RS 104 and/or STA 106 may be a computing device with a substantially fixed location (e.g., a desktop computer, kiosk, etc.) While FIG. 1 shows three APs 102, a single RS 104, and three STAs 106, in general the number of APs 102, RSs 104, and STAs 106 in the wireless network 100A may vary. Each RS 104 and STA 106 may communicate with a respective AP 102 if it is within range of the AP 102. Transmissions from an AP 102 to an RS 104 or a STA 106 are referred to as downlink transmissions. Transmissions from an RS 104 or STA 106 to an AP 102 are referred to as uplink transmissions.

The APs 102 may provide the RS 104 and STAs 106 with access to one or more networks 108 beyond the wireless network 100A, and thus serve as gateways to one or more wider networks 108. For example, the APs 102 may provide the RS 104 and STAs 106 with access to a wide-area network (WAN), metropolitan-area network (MAN), campus network, and/or the Internet. The RS 104 and STAs 106 may access a remote server 110 through the APs 102 and network 108.

In some embodiments, the APs 102 periodically broadcast beacon frames ("beacons"), which are received by the RS 104 and STAs 106. For example, each AP 102 broadcasts beacons with a periodicity of 100 ms. Beacons are used to establish and/or maintain wireless connections (i.e., wireless links) between respective devices. A beacon may include a traffic indication map (TIM) indicating whether downlink data is available. A beacon may also include timing synchronization information, such as a timing synchronization function (TSF) value.

The RS 104 may serve as a reference device that helps a STA 106 to determine its position (e.g., using double-differencing), as described below with respect to FIGS. 2-4. In some embodiments, instead of (or in addition to) an RS 104, a reference access point (RAP) 112 may serve as a reference device, as shown in the wireless network 100B of FIG. 1B in accordance with some embodiments.

In some embodiments, the wireless networks 100A and 100B are wireless local area networks (WLANs). For example, the wireless network 100A or 100B may be a WiFi network that operates in accordance with one or more protocols in the IEEE 802.11 family of protocols. WiFi, however, is only one example of a type of wireless protocol that may be used to implement the wireless networks 100A and 100B; other examples are possible.

Figure 1B:
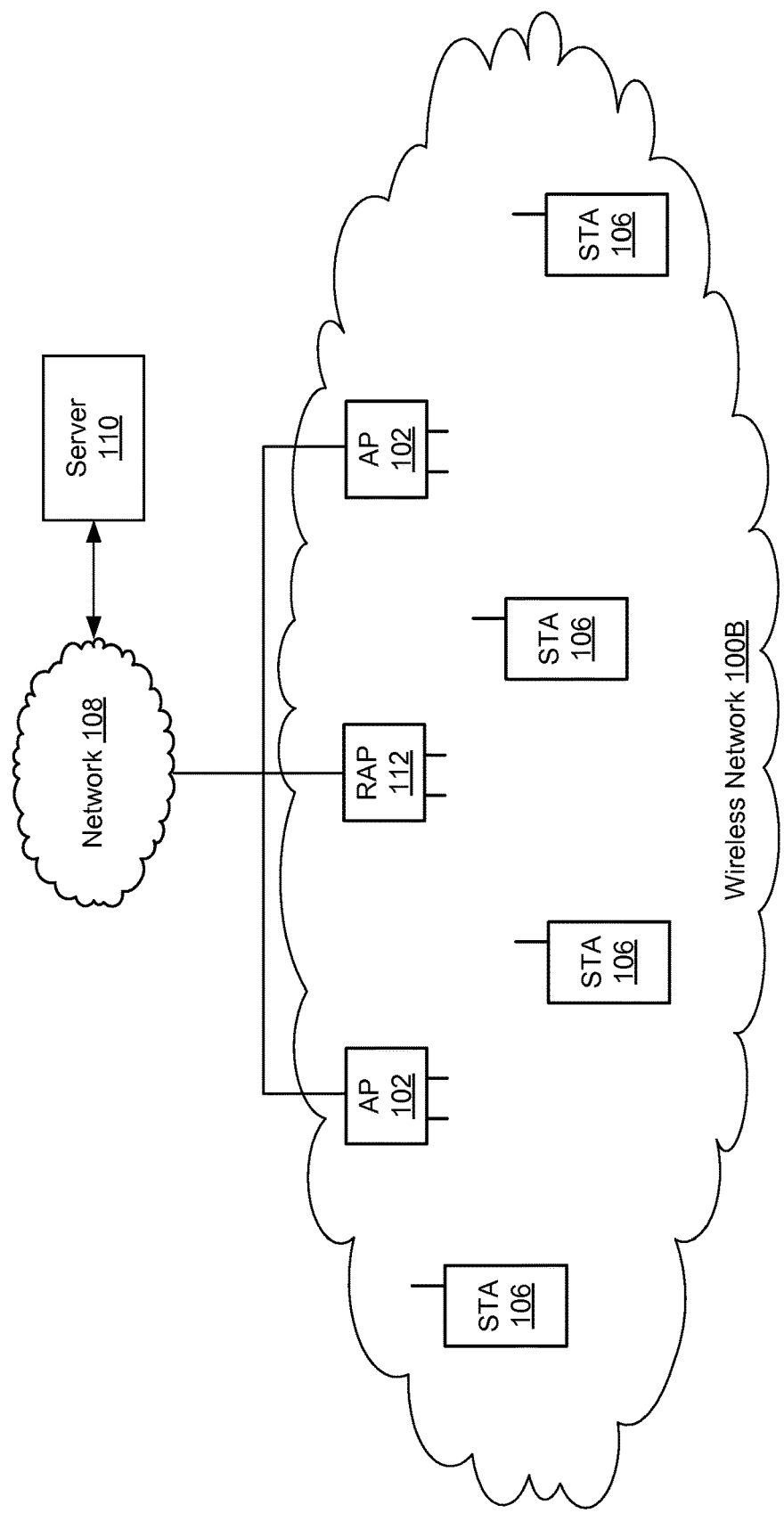
Figure 2:
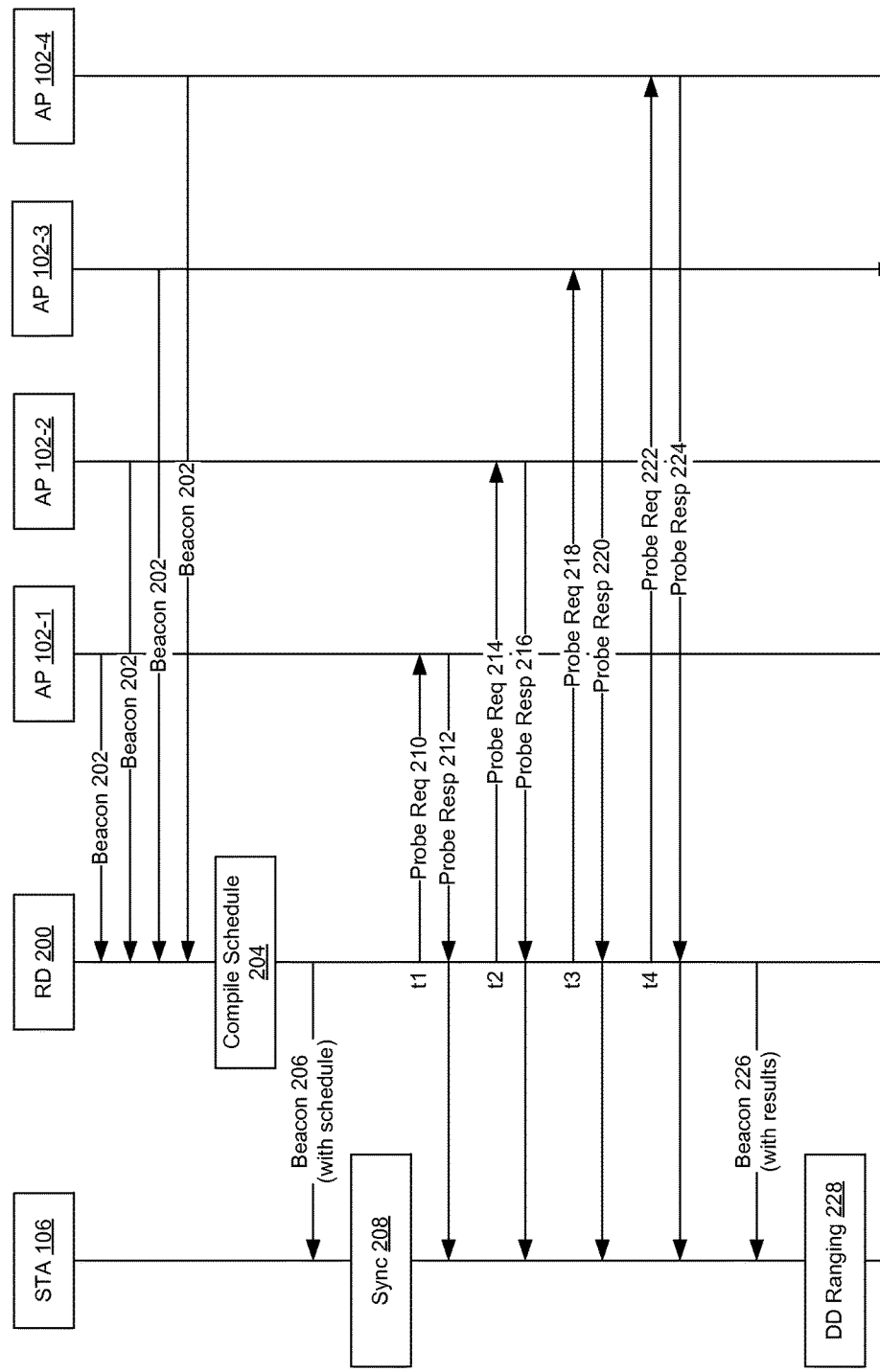
FIG. 2 illustrates a sequence of signals and operations used to determine the position of a station in a wireless network in accordance with some embodiments.

FIG. 2 illustrates a sequence of signals and operations used to determine the position of a STA 106 in accordance with some embodiments. The signals shown in FIG. 2 are transmitted between a STA 106, a reference device (RD) 200, and APs 102-1 through 102-4. The reference device 200 is a wireless device that acts as a reference for determining the location of the STA 106 (e.g., using double differencing); examples include the RS 104 (FIG. 1A) and the reference AP 112 (FIG. 1B). The APs 102-1 through 102-4 are examples of APs 102 (FIGS. 1A-1B). While FIG. 2 shows four APs 102-1 through 102-4, the number of APs used for positioning may vary. Also, while FIG. 2 shows a single STA 106, multiple STAs 106 may determine their respective locations (i.e., may perform positioning) simultaneously using the signals in FIG. 2. The overhead associated with the signals in FIG. 2 is independent of the number of STAs 106 that are determining their respective locations, and thus does not increase as the number of STAs 106 increases.

In FIG. 2, the reference device 200 identifies and obtains information regarding APs 102 that are available for use in positioning. For example, the reference device 200 passively scans for APs 102, and identifies the APs 102-1 through 102-4 based on beacons 202 received from the APs 102-1 through 102-4. Alternatively, the reference device 200 actively scans for APs 102 by broadcasting probe request messages and receiving probe response messages; the APs 102-1 through 102-4 are identified based on their probe responses. The reference device 200 may scan for APs 102 on multiple channels (e.g., on all available channels in the wireless network 100A or 100B). The beacons 202, or alternatively the probe responses, inform the reference device 200 of various parameters respectively associated with the APs 102-1 through 102-4. Examples of these parameters include, for each of the APs 102-1 through 102-4, the basic service set identifier (BSSID), service set identifier (SSID), operating bandwidth, supported data rate, other capabilities, load situation (e.g., airtime usage and thus amount of traffic), timing information, etc.

The reference device 200 selects APs 102 for use in positioning from among the identified APs 102. In the example of FIG. 2, the APs 102-1 through 102-4 are selected. In some embodiments, APs 102 are selected based on one or more of their signal strengths, load situations, channels in use, supported data rates, operating bandwidths, and other parameters (e.g., other vendor-specific parameters). For example, the reference device 200 selects APs 102 to increase (e.g., maximize) the likelihood that the STA 106 will receive messages from the APs 102 and/or decrease (e.g., minimize) the time for performing measurements using the messages. In one example, the reference device 200 selects APs 102 (e.g., a specified number of APs 102) with loads that satisfy a criterion (e.g., with the lowest loads), such that the selected APs 102 can respond quickly to trigger messages that trigger response messages used for positioning. In another example, the reference device 200 selects APs 102 (e.g., a specified number of APs 102) with beacon intervals that are aligned to within a specified degree, such that the measurement operations will not collide with beacon transmissions from the selected APs 102. In yet another example, the reference device 200 selects APs 102 (e.g., a specified number of APs 102) with operating bandwidths that satisfy a criterion (e.g., that exceed, or equal or exceed, a threshold), to ensure high accuracy in positioning measurements. In still another example, the reference device 200 selects APs 102 operating on the same channel, to save time associated with switching channels, and thus to reduce overhead associated with positioning measurements. In yet another example, the reference device 200 selects APs 102 (e.g., a specified number of APs 102) with different signal strengths, to increase (e.g. maximize) the likelihood that STAs 106 fall within a convex polygon formed by the APs 102 (with the APs 102 at the vertices of the polygon), such that the positioning accuracy can be improved. In some embodiments, the reference device 200 selects APs 102 using location information that was included in the beacons 202, included in probe responses, and/or obtained from a network server (e.g., the remote server 110). For example, the reference device 200 uses this location information to select APs 102 that increase (e.g. maximize) the likelihood that STAs 106 fall within a convex polygon formed by the APs 102.

The reference device 200 compiles (204) a measurement schedule for the selected APs 102-1 through 102-4. The measurement schedule specifies times at which the STA 106 is to tune to respective channels to receive messages from the APs 102-1 through 102-4. The messages, which may be referred to as measurement messages, will be used to perform positioning.

In some embodiments, the reference device 200 transmits the schedule in a message that can be heard by the STA 106 (e.g., by all STAs 106 seeking to determine their positions). For example, the reference device 200 broadcasts a beacon 206 that includes the schedule. In another example, the reference device 200 transmits the schedule in an unsolicited Public Action Frame that can be heard by all STAs 106. In yet another example, the reference device 200 multicasts a data frame containing the schedule to a multicast group address that includes the STA(s) 106.

In some embodiments, the reference device 200 provides the schedule to the server 110 (FIGS. 1A-1B), and the STA 106 downloads the schedule from the server 110. The reference device 200 thus may provide the schedule to the server 110 either directly (e.g., in a beacon, Public Action Frame, or multicast data frame) or indirectly (e.g., via the server 110).

In some embodiments, the schedule includes multiple entries, with each entry corresponding to an AP 102 on a particular channel. For example, the schedule includes the following information:

[Schedule]::=<ToD Timestamp>
 {Ranging Start Count}
 *[Ranging Plan]

The time-of-departure (ToD) timestamp is a timestamp that the reference device 200 applies to the schedule upon transmission, based on a clock in the reference device 200. The ranging start count indicates a number of beacon cycles before the positioning is to be performed: the STA 106 counts down from the ranging start count (e.g., by one each beacon period) and performs positioning in accordance with the schedule when the count reaches a specified value (e.g., zero). The ranging plan may include the following information for each entry:

[Ranging Plan]::=<Time to listen>
 {Primary Channel ID}
 {Channel Bandwidth}
 {Message Type}
 {BSSID}
 {SSID}
 {RD MAC Address}

<Time to listen> is the scheduled time at which the STA 106 is to tune to the channel. The primary channel ID and channel bandwidth together define the channel: channel bandwidth specifies the bandwidth of the channel (e.g., 20, 40, 80, or 160 MHz) and primary channel ID specifies a primary channel (e.g., a primary 20 MHz channel) that is included within the channel. The BSSID and SSID are the BSSID and SSID of the AP 102 that is to transmit the message. The RD MAC address is the media access control (MAC) address of the reference device 200.

The message type specifies the type of message to be transmitted by a respective AP 102 for use in a positioning measurement. For example, the message type may be a management frame (e.g., a probe response, such as the probe responses 212, 216, 220, and 224). In another example, the message type may be an action frame. In still another example, a message type of data is specified, in which case the positioning message sent from the AP 102 would be an acknowledgment (ACK) control frame. For this case, the ACK sent from the AP 102 does not carry the MAC address of the AP 102 and does not carry a ToD timestamp. For this type of operation, the reference device 200 and STAs 106 monitor for both the trigger message and the corresponding ACK. The ToD and MAC address could be derived from the trigger message, since the ACK has some time relevance with the trigger message (e.g. occurs within a short interframe period of a known duration, as defined for example in IEEE 802.11 standards).

In some embodiments, the reference device 200 (or alternatively, the server 110) may control which STAs 106 can receive the schedule by using a group key to encrypt the schedule. A STA 106 may obtain the group key from the reference device 200 by associating with (e.g., connecting to) the reference device 200, or may obtain the group key from the server 110 through the network 108 (e.g., over the Internet) by registering with the server 110. The operator of the wireless network 100A or 100B could charge for access to the group key and thus monetize the positioning procedure.

To perform positioning, the STA 106 first scans for a reference device 200 in its vicinity. The STA 106 may identify the reference device 200, for example, based on a predefined SSID assigned to the reference device 200. In another example, the STA 106 identifies the reference device 200 based on a capability element in a message from the reference device 200 (e.g., in a beacon, probe response, or (re)association response). Alternatively, the STA 106 is provided with the MAC address of the reference device 200.

By listening to the beacon 206 from the reference device 200, the STA 106 obtains the schedule and its associated ToD timestamp. In some embodiments, the beacon 206 does not include the schedule, but instead provides a uniform resource locator (URL) for the server 110. The STA 106 uses the URL to download the schedule from the server 110. The beacon 206 includes the ToD timestamp regardless of whether it includes the schedule or the URL.

The STA 106 uses the ToD timestamp from the beacon 206 to synchronize (208) its timing with the reference device 200. The ToD timestamp thus allows a local clock in the STA 106 to be synchronized with a local clock in the reference device 200.

The reference device 200 sends a trigger message at a time t1 that corresponds to (e.g., equals, or is offset by a specified amount from) the <Time to listen> for a particular entry in the schedule. The trigger message is directed to the AP 102-1, as specified by the BSSID and SSID in the schedule entry, and is transmitted on a channel used by the AP 102-1, as specified in the schedule entry (e.g., as specified by the primary channel ID and channel bandwidth). The message type of the trigger message is defined in the schedule entry. In the example of FIG. 2, the trigger message is a probe request 210. The reference device 200 selects a modulation and coding scheme (MCS), and thus a data rate, for the trigger message that ensures that the STA 106 can receive the trigger message. For example, the trigger message is sent with the most robust MCS and thus the lowest data rate available, or is sent with an MCS that is specified as being supported by all STAs 106 that comply with a particular protocol (e.g., a particular IEEE 802.11 protocol).

The trigger message (e.g., the probe request 210) triggers a response message (e.g., a probe response 212) from the AP 102-1. The reference device 200 receives the response message. For example, the reference device 200 filters messages on the specified channel using parameters specified in the relevant schedule entry (e.g., message type, BSSID, SSID, and RD MAC address) to identify the response message. The reference device 200 tags the response message with a time-of-arrival (ToA) timestamp and a source address (e.g., the BSSID of the AP 102-1). The reference device 200 saves this information in a respective result entry in memory. For example, the result entry may include the following information:

[Result]::=<AP BSSID>
{ToD timestamp}
{RD MAC Address}
{ToA timestamp}

The STA 106 also receives the response message (e.g., the probe response 212) from the AP 102-1. To receive the response message, the STA 106 first tunes to the channel specified in the relevant schedule entry. The STA 106 tunes to this channel at the <Time to listen> specified in the schedule entry, or at a time offset from <Time to listen> by an amount that still allows the STA 106 to receive the response message, and listens to the channel for at least a specified period of time (e.g., in the range of 5-10 ms). In some embodiments, the STA 106 listens for the response message by filtering frames based on information specified in the schedule entry. For example, the STA 106 filters frames based on the source address (e.g., BSSID) of the AP 102-1, the target address (e.g., RD MAC address) of the reference device 200, and the message type. The STA 106 tags the response message with a ToA timestamp and a source address (i.e., the BSSID of the AP 102-1) and saves this information in a respective result entry in memory. This result entry may have a structure analogous to the corresponding result entry in the reference device 200.

The reference device 200 subsequently sends trigger messages on respective channels at times t2, t3, and t4, in accordance with respective entries in the schedule. For example, the reference device 200 transmits probe requests 214, 218, and 222. These trigger messages are respectively directed to APs 102-2, 102-3, and 102-4. The trigger messages trigger response messages (e.g., probe responses 216, 220, and 224) from the APs 102-2, 102-3, and 102-4. The STA 106 and reference device 200 receive the response messages, tag the response messages, and generate corresponding result entries in the manner describes for the first response message (e.g., probe response 212).

In some embodiments, the reference device 200 selects multiple APs 102 operating on the same channel for use in positioning (e.g., to save time associated with switching channels). The reference device 200 broadcasts a single trigger message (e.g., a single probe request) on the channel. The multiple APs 102 respond to the single trigger message with respective response messages (e.g., in accordance with a carrier sense multiple access protocol), which are received and tagged by the reference device 200 and STA 106.

It may be desirable to use wide-bandwidth signals for the response messages, to improve the accuracy of positioning measurements. In some wireless protocols, however, probe requests and responses may use the minimum available channel bandwidth (e.g., 20 MHz). Accordingly, in some embodiments the trigger messages and response messages use wider-than-minimum bandwidths (e.g., 40 MHz, 80 MHz, or 160 MHz). For example, the trigger messages and response messages use the maximum available bandwidth (e.g., 160 MHz). These messages may be data frames, in which case the reference device 200 and the STA 106 connect to the APs 102-1 through 102-4 before the reference device 200 transmits the trigger messages. The reference device 200 may synchronize its timing with the APs 102-1 through 102-4 and store contexts corresponding to each of the APs 102-1 through 102-4.

The reference device 200 compiles its measurement results, as stored in result entries, into a result list. The reference device 200 distributes the result list to all STAs 106 within range that perform positioning. The reference device 200 distributes the result list in a manner analogous to its distribution of the schedule. For example, the reference device 200 broadcasts the result list in a beacon 226. In other examples, the reference device 200 distributes the result list via an unsolicited Public Action Frame that can be received by the STAs 106, via a multicast data packet, or by posting the result list on the server 110.

The STA 106 combines the measurement results from the reference device 200 with its own measurement results as stored locally in result entries. The STA 106 uses the combined measurement results to calculate its position using (228) a double-differencing ranging technique. The STA 106 also uses the locations of the reference device 200 and the APs 102-1 through 102-4 in this calculation. In some embodiments, these locations are provided to the STA 106 along with the schedule (e.g., in the beacon 206) or along with the measurement results from the reference device 200 (e.g., in the beacon 226). The locations of the APs 102-1 through 102-4 would thus have been previously communicated to the reference device 200, which would have previously determined or been provided with its own location. Alternatively, the STA 106 may download the locations of the reference device 200 and/or the APs 102-1 through 102-4 from the server 110.

In some embodiments, the wireless network 100A or 100B includes multiple reference devices 200. A STA 106 may receive information (e.g., schedules and/or measurement results) from the multiple reference devices 200 and use this information to determine its position through double-differencing. The increased number of results provided by the multiple reference devices 200 improves the accuracy of the calculated position, as compared to a position calculated with results from a single reference device 200.

The multiple reference devices 200 may coordinate in selecting APs 102 for use in positioning, in accordance with some embodiments. For example, respective reference devices 200 may pick subsets of the APs 102 for inclusion in their schedules and notify other reference devices 200 of their selected subsets (e.g., using over-the-air or backhaul communications). Based on this exchange, the reference devices 200 may adjust either their subsets or the sequence of the APs 102 in their subsets. These adjustments may decrease (e.g., minimize) the time taken to determine the position of a STA 106, by ensuring that an initial number of measurements are sufficient to allow the STA 106 to calculate its position.

Figure 3:
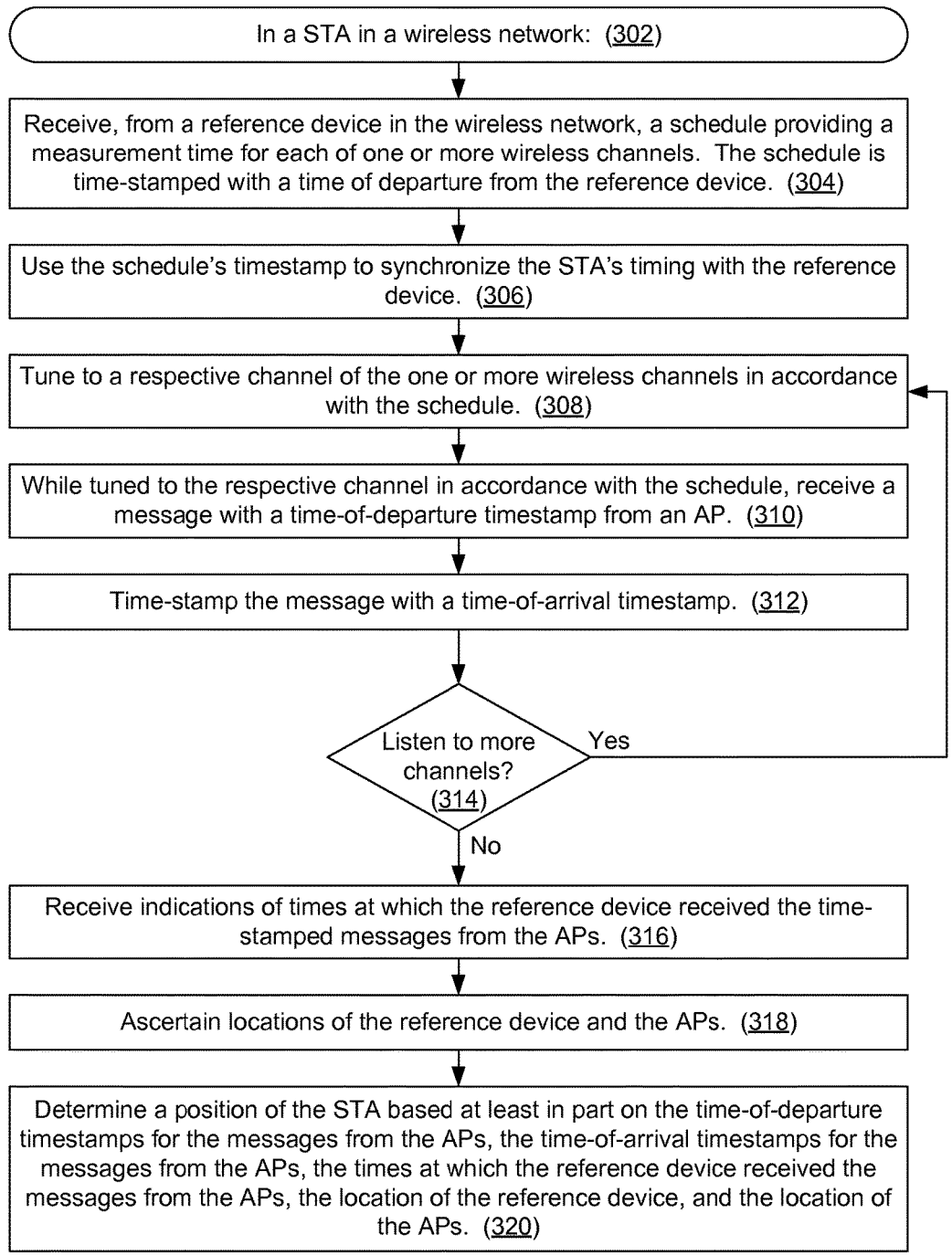
FIG. 3 is a flowchart of a positioning method performed in a station in accordance with some embodiments.

FIG. 3 is a flowchart of a positioning method 300 in accordance with some embodiments. The method 300 is performed (302) by a STA 106 in the wireless network 100A or 100B. For example, the method 300 corresponds to operations performed by the STA 106 as described with respect to FIG. 2.

In the method 300, the STA 106 receives (304) a schedule from a reference device 200 in the wireless network 100A or 100B. The schedule may be received from the reference device 200 directly (e.g., in the beacon 206) or indirectly (e.g., from the server 110). The schedule provides a measurement time for each of one or more wireless channels. The schedule is time-stamped with a ToD from the reference device 200.

The STA 106 uses the schedule's timestamp (i.e., the ToD) to synchronize (306) its timing with the reference device 200.

The STA 106 tunes (308) to a respective channel of the one or more wireless channels in accordance with the schedule. While tuned to the respective channel in accordance with the schedule, the STA 106 receives (310) a message from an AP 102 (e.g., the AP 102-1, 102-2, 102-3, or 102-4, FIG. 2). The message (e.g., a probe response 212, 216, 220, or 224) includes a ToD timestamp. The STA 106 time-stamps (312) the message with a ToA timestamp.

The STA 106 determines whether to listen to more channels (314). For example, the STA 106 determines whether there are more channels specified in the schedule. Alternatively, the STA 106 determines whether it has received messages from a predefined number of APs 102, regardless of a total number of APs 102 and corresponding channels specified in the schedule.

If there are more channels to listen to (314—Yes), then the operations 308, 310, and 312 are repeated for each of the remaining channels.

Otherwise (314—No), the STA 106 receives (316) indications (e.g., in a results message, an example of which is the beacon 226) of times at which the reference device received the time-stamped messages from the APs 102. The times at which the reference device received the time-stamped messages are indicated by ToA timestamps as applied by the reference device 200.

The STA 106 ascertains (318) locations of the reference device 200 and the APs 102 (e.g., the AP 102-1, 102-2, 102-3, or 102-4). For example, the STA 106 receives these locations along with the schedule or along with the results message from the reference device 200.

The STA 106 determines (320) its position based at least in part on the ToD timestamps for the messages from the APs 102, the ToA timestamps for the messages from the APs 102 as applied by the STA 106, the times at which the reference device 200 received the messages from the APs 102 (i.e., the ToA timestamps applied by the reference device 200), the location of the reference device 200, and the location of the APs 102.

In some embodiments of the method 300, the STA 106 receives the schedule and the results message from the reference device 200 without having first connected to the reference device 200 (i.e., in the absence of a connection with the reference device 200).

In some embodiments of the method 300, the STA 106 uses only a subset of the schedule. The STA 106 determines its position using messages received in accordance with the subset and determines whether an accuracy of the position measurement satisfies a criterion (e.g., exceeds, or equals or exceeds, a threshold). If the criterion is satisfied, the STA 106 disregards the remainder of the schedule (i.e., the portion of the schedule that does not include the subset).

Figure 4:
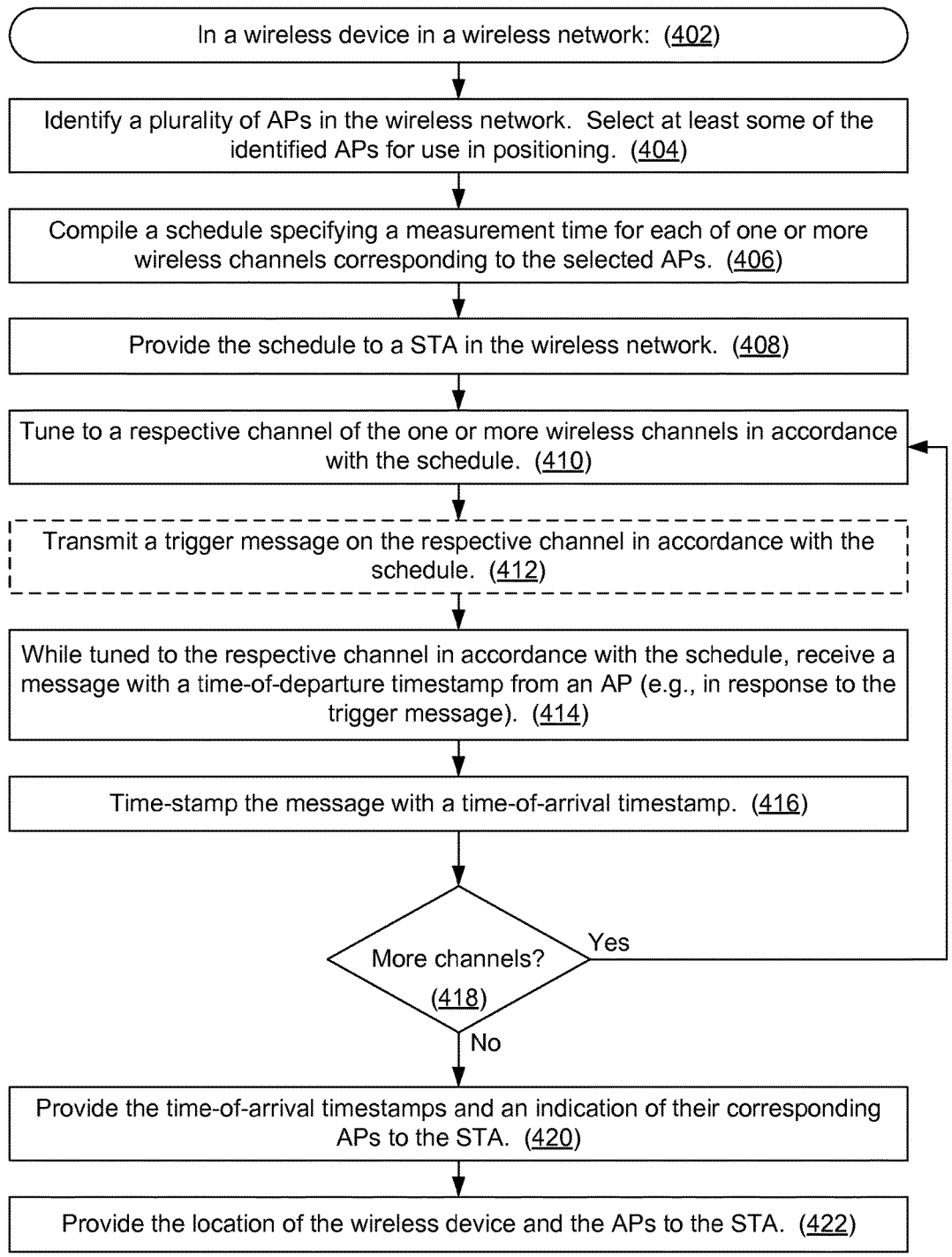
FIG. 4 is a flowchart of a method performed in a reference device to facilitate positioning, in accordance with some embodiments.

FIG. 4 is a flowchart of a method 400 of facilitating positioning in accordance with some embodiments. The method 400 is performed (402) by a wireless device that acts as a reference device 200 (e.g., an RS 104, FIG. 1A, or reference AP 112, FIG. 1B) in the wireless network 100A or 100B. The method 400 is a counterpart to the method 300 (FIG. 3). For example, the method 400 corresponds to operations performed by the reference device 200 as described with respect to FIG. 2.

The reference device 200 identifies (404) a plurality of APs 102 in the wireless network 100A or 100B (e.g., based on beacons 202) and selects at least some of the identified APs 102 for use in positioning. The reference device 200 compiles (406) a schedule specifying a measurement time for each of one or more wireless channels corresponding to the selected APs 102. The reference device 200 provides (408) the schedule to a STA 106 (or to multiple STAs 106) in the wireless network 100A or 100B. The schedule may be provided to the STA(s) 106 directly (e.g., in the beacon 206) or indirectly (e.g., via the server 110).

The reference device 200 tunes (410) to a respective channel of the one or more wireless channels in accordance with the schedule. In some embodiments, the reference device 200 transmits (412) a trigger message (e.g., a probe request 210, 214, 218, or 222) on the respective channel in accordance with the schedule. In some embodiments, transmission of the trigger message may be omitted if the reference device 200 determines that a level of traffic, and thus the load, for an AP 102 on the respective channel satisfies a threshold indicating a likelihood that the AP 102 will transmit a message at a time corresponding to the schedule without receiving a trigger message.

While tuned to the respective channel in accordance with the schedule, the reference device 200 receives (414) a message with a ToD timestamp from an AP 102 (e.g., from one of the APs 102-1 through 102-4). For example, the message (e.g., a probe response 212, 216, 220, or 224) is received in response to the trigger message. The reference device 200 time-stamps (416) the message with a ToA timestamp.

If there are more channels specified in the schedule (418—Yes), the operations 410, 412, 414, and 416 are repeated for the remaining channels. Otherwise (418—No), the reference device 200 provides the ToA timestamps and an indication of their corresponding APs 102 to the STA 106 (420). This information (e.g., in the form of a results list) is provided, for example, in a results message (e.g., the beacon 226) or via the server 110. The reference device 200 also provides (422) the location of the reference device 200 and the APs 102-1 through 102-4 to the STA 106.

In some embodiments, the reference device 200 transmits multiple results messages, each containing results corresponding to a respective portion of the schedule. An intermediate results message may be transmitted before the reference device 200 has obtained all of the results corresponding to the schedule.

The method 400 thus provides the STA 106 with information to be used to perform double differencing to determine the location of the STA 106.

While the methods 300 and 400 include a number of operations that appear to occur in a specific order, it should be apparent that the methods 300 and 400 can include more or fewer operations. Some operations can be executed serially or in parallel, an order of two or more operations may be changed, performance of two or more operations may overlap, and two or more operations may be combined into a single operation.

The sequence of signals and operations of FIG. 2, and the methods 300 (FIG. 3) and 400 (FIG. 4), limit the impact of positioning on performance of the wireless network 100A or 100B, by limiting transmission and reception of signals (e.g., probe requests 210, 214, 218, and 222, and probe responses 212, 216, 220, and 224) used for positioning to preset times in accordance with the schedule. Normal data communication sessions can be carried out at other times without interruption. Furthermore, the methods 300 and 400 scale well: as the number of STAs 106 increase, the overhead and cost for performing positioning do not increase. The methods 300 and 400 therefore are well suited for use in densely populated environments (e.g., shopping malls, urban areas, or offices buildings).

Furthermore, in some embodiments STAs 106 may perform positioning without first connecting to a reference device 200 and/or APs 102. Connectionless positioning protects user privacy. Also, the methods 300 and 400 may be performed without modification of existing APs 102, thus easing deployment. The possibility of the reference device 200 being either an RS 104 (FIG. 1A) or a reference AP 112 (FIG. 1B) provides flexibility in deployment.

Figure 5:
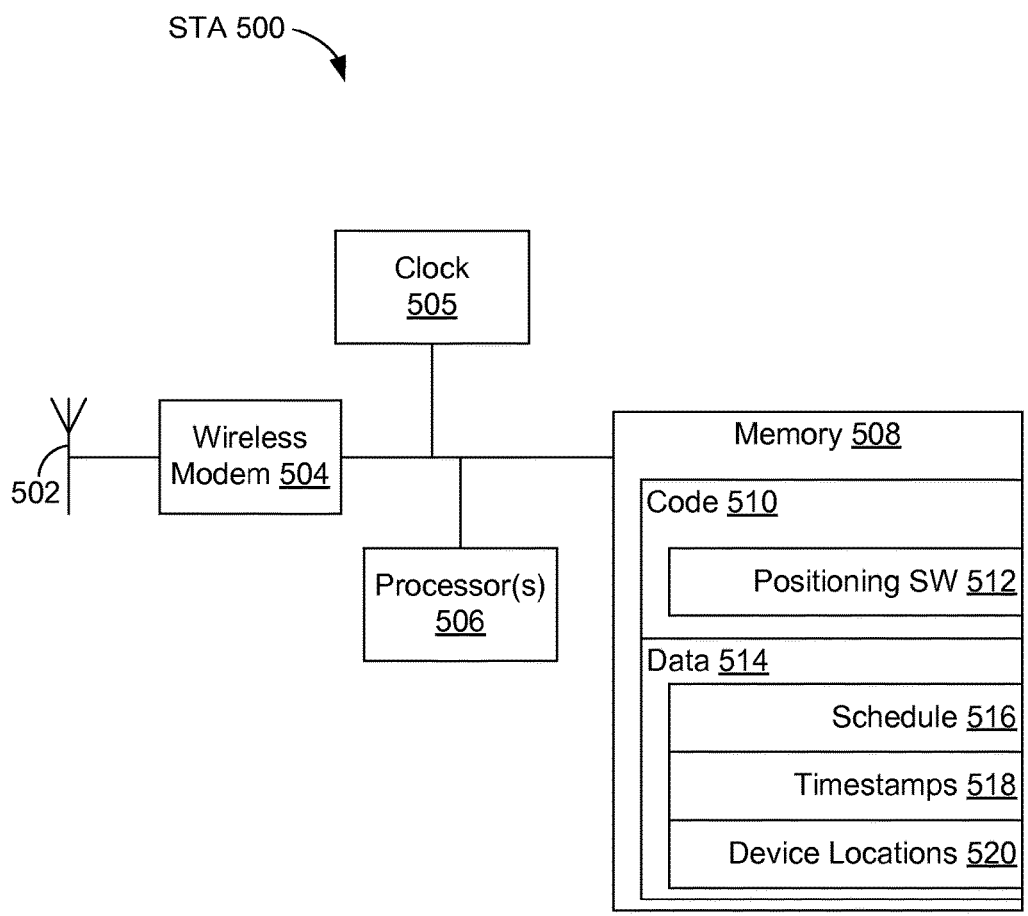
FIG. 5 is a block diagram of a station in a wireless network in accordance with some embodiments.

FIG. 5 is a block diagram of a STA 500 in accordance with some embodiments. The STA 500 is an example of a STA 106 (FIGS. 1A, 1B, and 2). The STA 500 includes one or more antennas 502 coupled to a wireless modem 504 that transmits and receives signals through the one or more antennas 502. The STA 500 also includes memory 508 and one or more processors 506. The memory 508 stores code 510 configured for execution by the one or more processors 506. The code 510 may be stored in a non-transitory computer-readable storage medium (e.g., non-volatile memory) in the memory 508. The memory 508 also stores data 514 to be referenced by the one or more processors 506 when executing the code 510. The STA 500 further includes a clock 505 that may be set to synchronize the STA 500 with another wireless device (e.g., with a reference device 200, FIG. 2). The clock 505 is used to generate timestamps.

The code 510 includes one or more programs with instructions configured for execution by the one or more processors 506. The one or more programs include positioning software 512 that, when executed by the one or more processors 506, causes the STA 500 to perform the method 300 (FIG. 3), and thus to achieve the functionality described for a STA 106 with respect to FIG. 2. The data 514 may include a schedule 516 (e.g., the schedule of the method 300), timestamps 518 (e.g., the timestamps of the method 300), and device locations 520 (e.g., including locations of APs 102 and one or more reference devices 200, as well as a location of the STA 500 as determined using double differencing).

Figure 6:
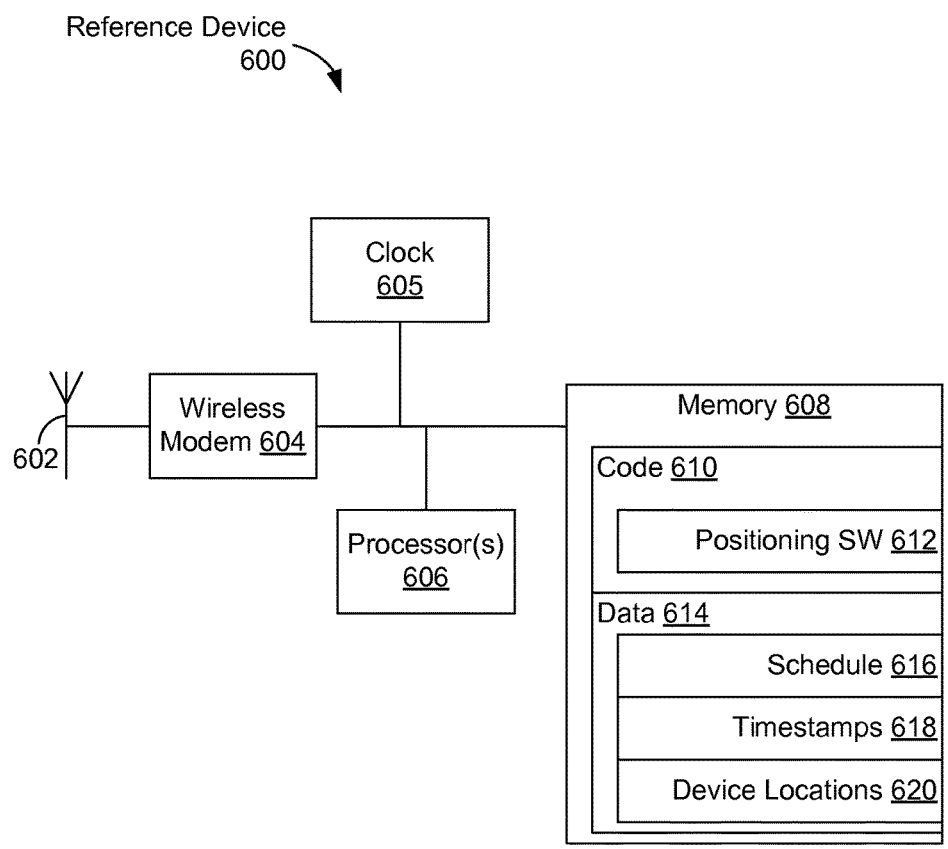
FIG. 6 is a block diagram of a reference device in a wireless network in accordance with some embodiments.

FIG. 6 is a block diagram of a reference device 600 in accordance with some embodiments. The reference device 600 is an example of a reference device 200 (FIG. 2), such as an RS 104 (FIG. 1A) or reference AP 112 (FIG. 1B). The reference device 600 includes one or more antennas 602 coupled to a wireless modem 604 that transmits and receives signals through the one or more antennas 602. The reference device 600 also includes memory 608 and one or more processors 606. The memory 608 stores code 610 configured for execution by the one or more processors 606. The code 610 may be stored in a non-transitory computer-readable storage medium (e.g., non-volatile memory) in the memory 608. The memory 608 also stores data 614 to be referenced by the one or more processors 606 when executing the code 610. The reference device 600 further includes a clock 605 that is used to generate timestamps.

The code 610 includes one or more programs with instructions configured for execution by the one or more processors 606. The one or more programs include positioning software 612 that, when executed by the one or more processors 606, causes the reference device 600 to perform the method 400 (FIG. 4), and thus to achieve the functionality described for a reference device 200 with respect to FIG. 2. The data 614 may include a schedule 616 (e.g., the schedule of the method 400), timestamps 618 (e.g., the timestamps of the method 400), and device locations 620 (e.g., including the location of the reference device 600 and locations of APs 102).

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A positioning method performed by a station (STA) in a wireless network, the method comprising:
   receiving, from a reference device in the wireless network, a schedule providing a measurement time for each of one or more wireless channels, wherein the schedule is time-stamped by the reference device with a time of departure of the schedule from the reference device;
   tuning to a first channel of the one or more wireless channels in accordance with the schedule;
   while tuned to the first channel in accordance with the schedule, receiving a first message from a first access point (AP), the first message including a time-of-departure timestamp of the first message;
   time-stamping the first message with a time-of-arrival timestamp;
   synchronizing timing in the STA with timing in the reference device using the time of departure of the schedule from the reference device;
   receiving an indication of a time at which the reference device received the first message from the first AP; and
   determining a position of the STA based in part on the time-of-departure timestamp of the first message included in the first message, the time-of-arrival timestamp of the first message, and the time at which the reference device received the first message.

2. The method of claim 1, further comprising:
   ascertaining locations of the reference device and the first AP; and
   using the locations of the reference device and the first AP in determining the position of the STA.

3. The method of claim 1, wherein receiving the schedule comprises receiving a beacon frame containing the schedule.

4. The method of claim 1, wherein:
   the schedule specifies one or more parameters associated with the first AP; and
   receiving the first message from the first AP comprises using the one or more parameters associated with the first AP to filter frames.

5. The method of claim 4, wherein the one or more parameters associated with the first AP comprise a basic service set identifier (BSSID) for the first AP and a service set identifier (SSID) for the first AP.

6. The method of claim 4, wherein the schedule further specifies:
   a message type for the first message;
   an address for the reference device;
   a primary channel and a channel bandwidth for each of the one or more wireless channels; and
   an indicator of a beacon cycle in which to use the schedule.

7. The method of claim 1, wherein receiving the first message from the first AP comprises receiving a probe response from the first AP.

8. The method of claim 1, wherein the one or more wireless channels comprise a plurality of channels, the method further comprising:
   tuning to respective channels of the plurality of channels at respective times, in accordance with the schedule;
   while tuned to the respective channels in accordance with the schedule, receiving messages comprising time-of-departure timestamps from a plurality of APs, the messages including the first message;
   time-stamping the messages with time-of-arrival timestamps;
   receiving indications of times at which the reference device received the messages from the plurality of APs; and
   ascertaining locations of the reference device and the plurality of APs;
   wherein the position of the STA is determined based at least in part on the time-of-departure timestamps, the time-of-arrival timestamps, the times at which the reference device received the messages from the plurality of APs, and the locations of the reference device and the plurality of APs.

9. The method of claim 8, wherein the respective channels compose a subset of the plurality of channels in the schedule, the method further comprising:
   determining that an accuracy of the determined position of the STA, as determined using timestamps associated with messages received on the respective channels, satisfies a criterion; and
   disregarding a portion of the schedule corresponding to channels that are not in the subset.

10. The method of claim 1, further comprising,
    while tuned to the first channel in accordance with the schedule, receiving messages comprising time-of-departure timestamps from a plurality of APs, the messages including the first message;
    time-stamping the messages with time-of-arrival timestamps;
    receiving indications of times at which the reference device received the messages from the plurality of APs; and
    ascertaining locations of the reference device and the plurality of APs;
    wherein the position of the STA is determined based at least in part on the time-of-departure timestamps, the time-of-arrival timestamps, the times at which the reference device received the messages from the plurality of APs; and the locations of the reference device and the plurality of APs.

11. The method of claim 1, wherein receiving the schedule and the indication comprise receiving the schedule and the indication from the reference device in the absence of a connection between the STA and the reference device.

12. A wireless device comprising:
    one or more antennas;
    a wireless modem to transmit and receive transmissions on a wireless network through the one or more antennas;
    one or more processors; and
    memory storing one or more programs configured for execution by the one or more processors, the one or more programs comprising:
       instructions to tune, in accordance with a schedule received from a reference device in the wireless network, to a first channel of one or more wireless channels specified in the schedule, wherein the schedule provides a measurement time for each of the one or more wireless channels and is time-stamped by the reference device with a time of departure of the schedule from the reference device;
       instructions to receive a first message from a first access point (AP) while tuned to the first channel in accordance with the schedule, the first message including a time-of-departure timestamp of the first message;

instructions to time-stamp the first message with a time-of-arrival timestamp;

instructions to synchronize timing in the STA with timing in the reference device using the time of departure of the schedule from the reference device; and instructions to determine a position of the wireless device based in part on the time-of-departure timestamp of the first message included in the first message, the time-of-arrival timestamp of the first message, and a time at which the reference device received the first message, the time at which the reference device received the first message having been provided to the wireless device.

13. The wireless device of claim 12, wherein the instructions to determine a position of the wireless device comprise instructions to determine a position of the wireless device based further in part on locations of the reference device and the first AP.

14. A non-transitory computer-readable storage medium storing instructions that, when executed by one or more processors of a station (STA) in a wireless network, cause the STA to perform operations comprising:

receiving, from a reference device in the wireless network, a schedule providing a measurement time for each of one or more wireless channels, wherein the schedule is time-stamped by the reference device with a time of departure of the schedule from the reference device;

tuning to a first channel of the one or more wireless channels in accordance with the schedule;

while tuned to the first channel in accordance with the schedule, receiving a first message from a first access point (AP), the first message including a time-of-departure timestamp of the first message;

time-stamping the first message with a time-of-arrival timestamp;

synchronizing timing in the STA with timing in the reference device using the time of departure of the schedule from the reference device;

receiving an indication of a time at which the reference device received the first message from the first AP; and determining a position of the STA based in part on the time-of-departure timestamp of the first message included in the first message, the time-of-arrival timestamp of the first message, and the time at which the reference device received the first message.

* * * * *